United States Patent
Ahn et al.

(10) Patent No.: US 8,233,458 B2
(45) Date of Patent: Jul. 31, 2012

(54) METHOD OF CONTROLLING TRANSMISSION POWER IN A WIRELESS COMMUNICATION SYSTEM

(75) Inventors: Seung Jin Ahn, Anyang-si (KR); Kyung Ho Lee, Anyang-si (KR); Mu Ryong Kim, Anyang-si (KR); Sang Won Lee, Anyang-si (KR); Byung Kil Song, Anyang-si (KR)

(73) Assignee: LG Electronics Inc., Seoul (KR)

( * ) Notice: Subject to any disclaimer, the term of this patent is extended or adjusted under 35 U.S.C. 154(b) by 613 days.

(21) Appl. No.: 12/350,149

(22) Filed: Jan. 7, 2009

(65) Prior Publication Data

US 2009/0180433 A1    Jul. 16, 2009

Related U.S. Application Data

(60) Provisional application No. 61/019,583, filed on Jan. 7, 2008.

(30) Foreign Application Priority Data

Apr. 10, 2008  (KR) .................. 10-2008-0033025

(51) Int. Cl.
    *H04B 7/216* (2006.01)
(52) U.S. Cl. ........................................ 370/335; 370/342
(58) Field of Classification Search .................. 370/335, 370/329, 312, 342, 442; 455/522, 69
    See application file for complete search history.

(56) References Cited

U.S. PATENT DOCUMENTS

| | | | |
|---|---|---|---|
| 7,373,161 B2 * | 5/2008 | Anderson | 455/522 |
| 7,929,480 B2 * | 4/2011 | Chen et al. | 370/318 |
| 7,929,636 B2 * | 4/2011 | Kotecha | 375/285 |

* cited by examiner

*Primary Examiner* — Chandrahas Patel
(74) *Attorney, Agent, or Firm* — Lee, Hong, Degerman, Kang & Waimey

(57) ABSTRACT

A method of controlling transmission power in a wireless communication system includes allocating persistent radio resources, and transmitting transmission power control information multiplexed with data via a data channel according to the persistent resources. Transmission power can be simply controlled without reducing the capacity of a control channel according to persistent scheduling.

8 Claims, 15 Drawing Sheets

METHOD OF CONTROLLING TRANSMISSION POWER IN A WIRELESS COMMUNICATION SYSTEM

CROSS-REFERENCE TO RELATED APPLICATIONS

Pursuant to 35 U.S.C. §119, this application claims the benefit of earlier filing and right of priority to Korean Patent Application No. 10-2008-0033025, filed on Apr. 10, 2008, and also claims the benefit of U.S. Provisional Application No. 61/019,583, filed on Jan. 7, 2008, the contents of which are all hereby incorporated by reference herein in their entirety.

FIELD OF THE INVENTION

The present invention relates to wireless communications and, more particularly, to a method of controlling transmission power in a wireless communication system.

DESCRIPTION OF THE RELATED ART

A 3GPP ($3^{rd}$ Generation Partnership Project) based on a WCDMA (Wideband Code Division Multiple Access) wireless access technique is being extensively developed all over the world. An HSDPA (High Speed Downlink Packet Access), which may be defined as a first evolution of the WCDMA, provides a wireless access technique with a competitive edge in the mid-term future to the 3GPP. However, as requirements and expectations of users and service providers are continuously increasing and development of competitive wireless access techniques is ongoing, a new technical evolution in the 3GPP is requested to ensure competitiveness in the future. The requirements include a reduction in costs per bit, an increase in service availability, the use of flexible frequency bands, a simple structure and an open interface, proper power consumption of terminals, and the like.

One of systems considered in the next generation is an OFDM (Orthogonal Frequency Division Multiplexing) system that can attenuate an inter-symbol interference effect with a low complexity. The OFDM converts serially inputted data symbols into the N number of parallel data symbols, includes them in the N number of separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. OFDMA refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

Transmission power control (TPC) refers to a technique for solving a distance problem arising when user equipments located to be close to or away from a base station transmit signals. If the user equipments transmit signals with the same power, the signal transmitted by a user equipment located near the base station would be received to be even stronger than that transmitted by a user equipment located away from the base station. Then, the user equipment near the base station would have no problem in communications, while the user equipment away from the base station would undergo a relatively strong interference. Thus, the TPC is a technique for controlling transmission power of each user equipment to allow the base station to receive signals with the same size.

The TPC includes an open-loop TPC and a closed-loop TPC. The open-loop TPC is a scheme in which a transmission subject arbitrarily controls transmission power, rather than forming a loop for controlling by transmitting and receiving signals between a user equipment and the base station, and the closed-loop TPC is a scheme in which the base station and a user equipment interwork to control transmission power by using feedback information about power controlling.

Resource scheduling includes dynamic scheduling and persistent scheduling. The dynamic scheduling is a scheme in which whenever data is transmitted or received, scheduling information is requested via a control signal. The persistent scheduling is a scheme in which pre-set information is used so scheduling information via a control signal is not requested whenever data is transmitted or received.

FIG. 1 is a flow chart illustrating downlink data transmission using dynamic scheduling. A base station (BS) transmits scheduling information via a downlink (DL) grant to a user equipment (UE) each time it transmits downlink data. This is advantageous in that the BS can properly schedule radio resources according to a DL channel condition.

FIG. 2 is a flow chart illustrating uplink data transmission using dynamic scheduling. The UE is allocated radio resources via a uplink (UL) grant from the BS before transmitting uplink data.

FIG. 3 is a flow chart illustrating downlink data transmission using persistent scheduling. The BS and the UE previously set radio resources before transmitting downlink data, and the BS transmits downlink data according to the set radio resources.

FIG. 4 is a flow chart illustrating uplink data transmission using persistent scheduling. The BS and the UE previously set radio resources before transmitting uplink data, and the UE transmits uplink data according to the set radio resources.

Voice over Internet Protocol (VoIP) is a service of transmitting voice data via an IP, in which voice data, which is provided in a circuit switched (CS) domain, is provided in a packet switched (PS) domain. Compared with the CS-based voice service in which voice data is transmitted while maintaining an end-to-end connection, the VoIP enables transmission of voice data without maintaining connection (namely, connectionlessly), having the advantage that network resources can be effectively used.

In line with the advancement of radio communication technologies, user data is quickly increasing and the existing CS-based services are being largely replaced by the PS-based services to effectively use the limited network resources. The VoIP is also developed in this context, and it is anticipated that all the voice services are provided via the VoIP in the most wireless communication systems in the future.

In order to effectively provide the PS-based voice services, a real-time transport protocol (RTP) has been developed, and also an RTP control protocol (RTCP) has been developed to control the RTP. As for the RTP, each packet includes time stamp information, solving a jitter problem, and by reporting a loss of the RTP packet via the RTCP, a frame error rate (FER) can be reduced via rate controlling. Besides the RTP and RTCP, a session initiation protocol (SIP), a session description protocol (SDP), and the like, have been also developed to maintain a virtual connection end-to-end, so a delay problem can be considerably resolved.

FIG. 5 illustrates a traffic model in the VoIP.

With reference to FIG. 5, types of voice packets generated in the VoIP can be divided into a packet generated at a talkspurt and a packet generated at a silence period. For example, in case of a 12.2 kbps adaptive multi-rate (AMR), in the talkspurt, the RTP packet is generated at the period of 20 ms and has a size of 35 bytes to 49 bytes, and in the silence period, the RTP packet is generated at the period of 160 ms and has a size of 10 bytes to 24 bytes.

In the voice service such as the VoIP, when packets are generated at regular periods, the size of the generated packets is relatively small and uniform, for which, thus, the persistent scheduling is generally used. It is predicted in the process of establishing a radio bearer to persistently allocate radio resources, and accordingly, packets can be transmitted or received without a control signal including scheduling information.

When data is transmitted or received according to the persistent scheduling, data is transmitted by using pre-set radio resources. In this respect, however, the TCP information is possibly changed according to the movement of the UE, so the transmission method of the TCP information is to be discussed.

SUMMARY OF THE INVENTION

Therefore, an object of the present invention is to provide a method of controlling transmission power in a wireless communication system.

In an aspect, a method of controlling transmission power in a wireless communication system includes allocating persistent radio resources, and transmitting transmission power control information multiplexed with data via a data channel according to the persistent resources.

In another aspect, a method of transmitting data in a wireless communication system includes receiving data and multiplexed transmission power control (TCP) information via a data channel according to persistent resources allocated by a base station, controlling transmission power by using the TCP information, and transmitting uplink data with the transmission power.

DETAILED DESCRIPTION OF THE INVENTION

Figure 1:
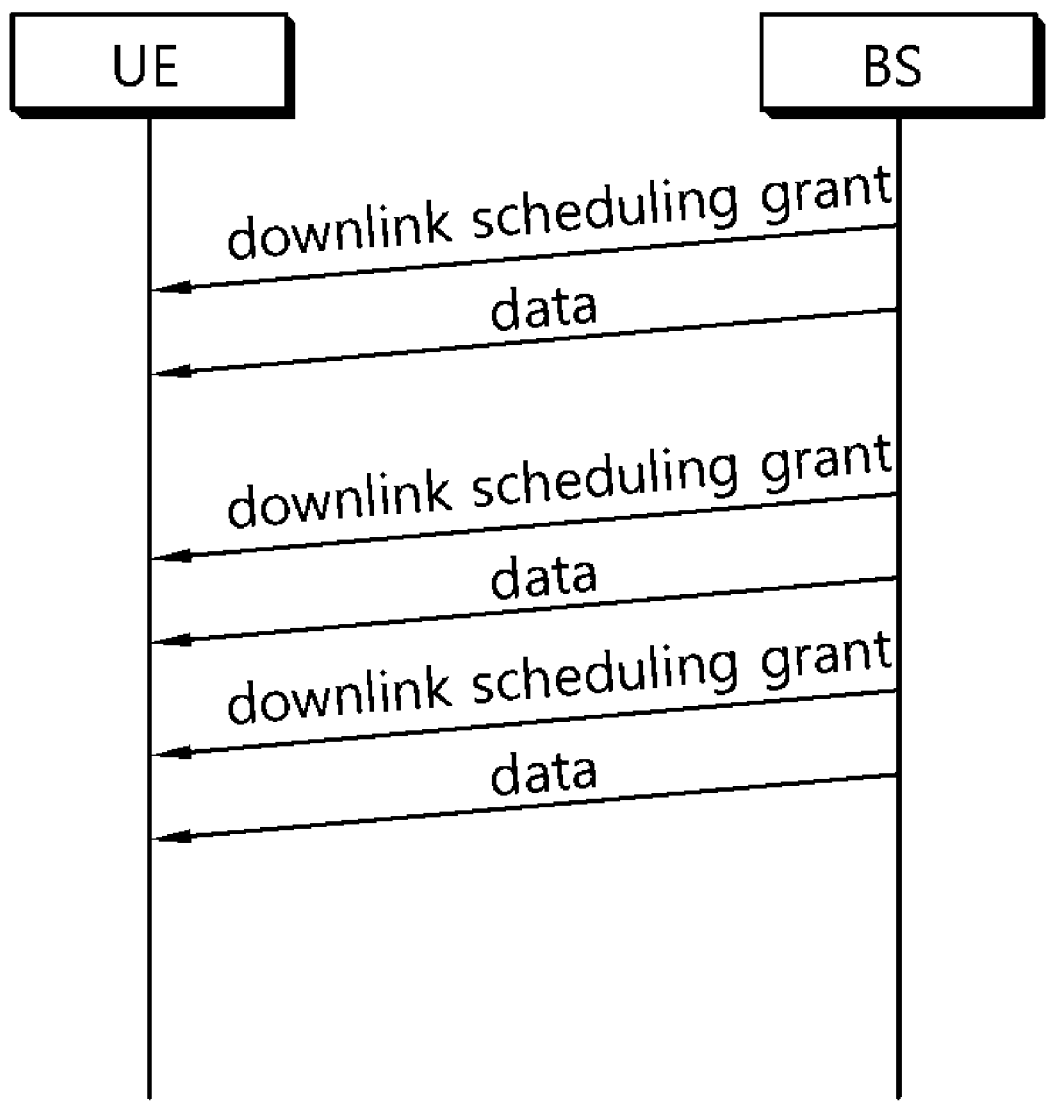
FIG. 1 is a flow chart illustrating downlink data transmission using dynamic scheduling.
Figure 2:
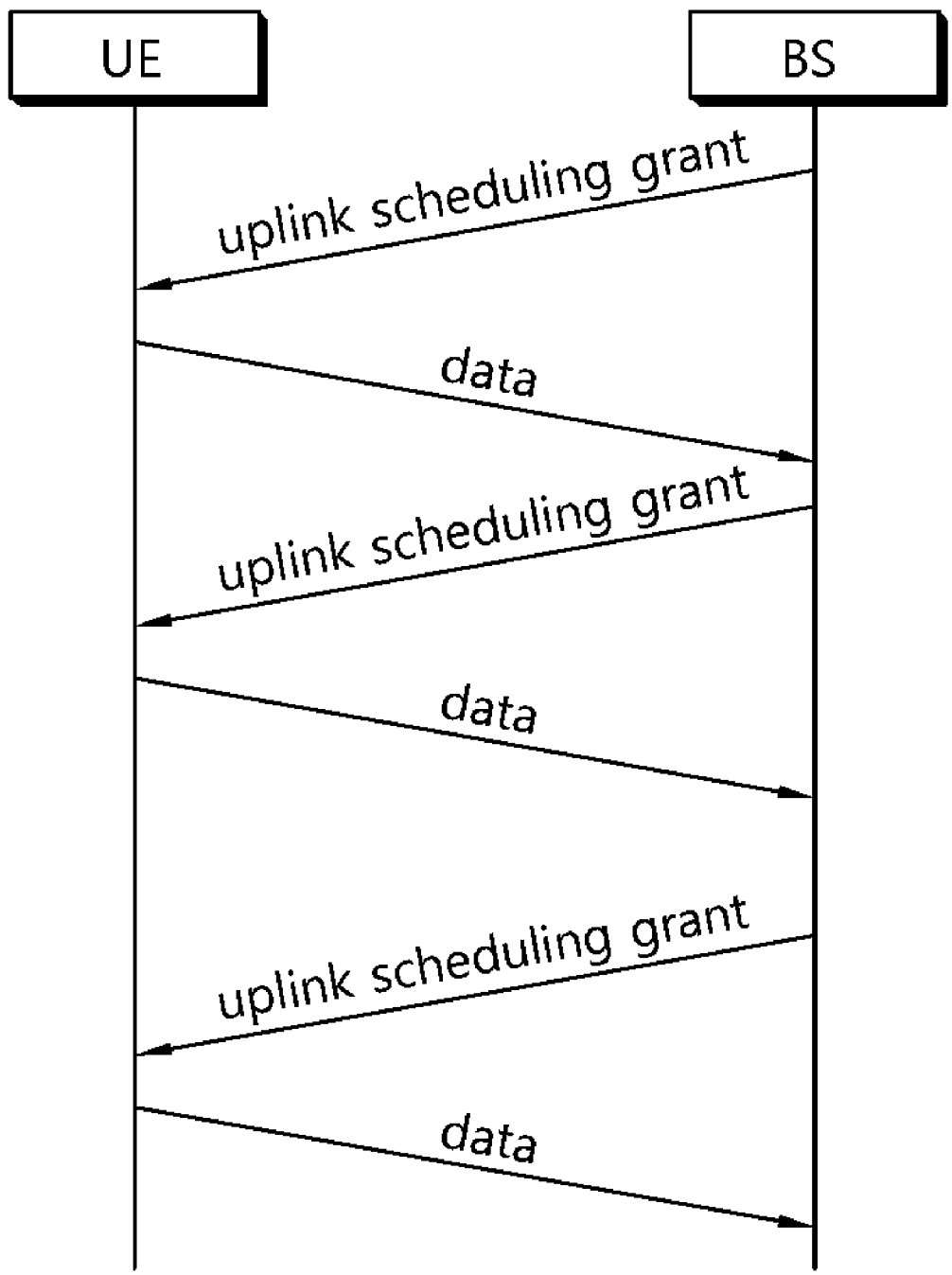
FIG. 2 is a flow chart illustrating uplink data transmission using dynamic scheduling.
Figure 3:
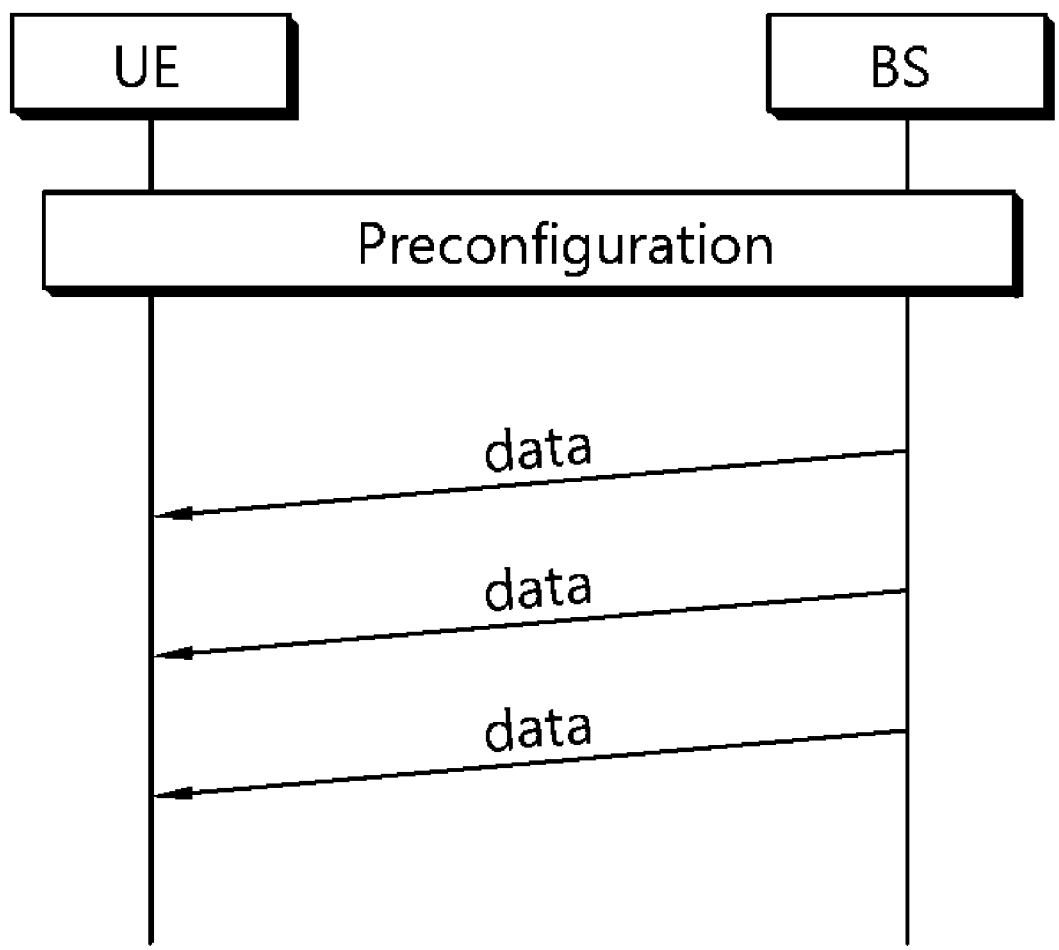
FIG. 3 is a flow chart illustrating downlink data transmission using persistent scheduling.
Figure 4:
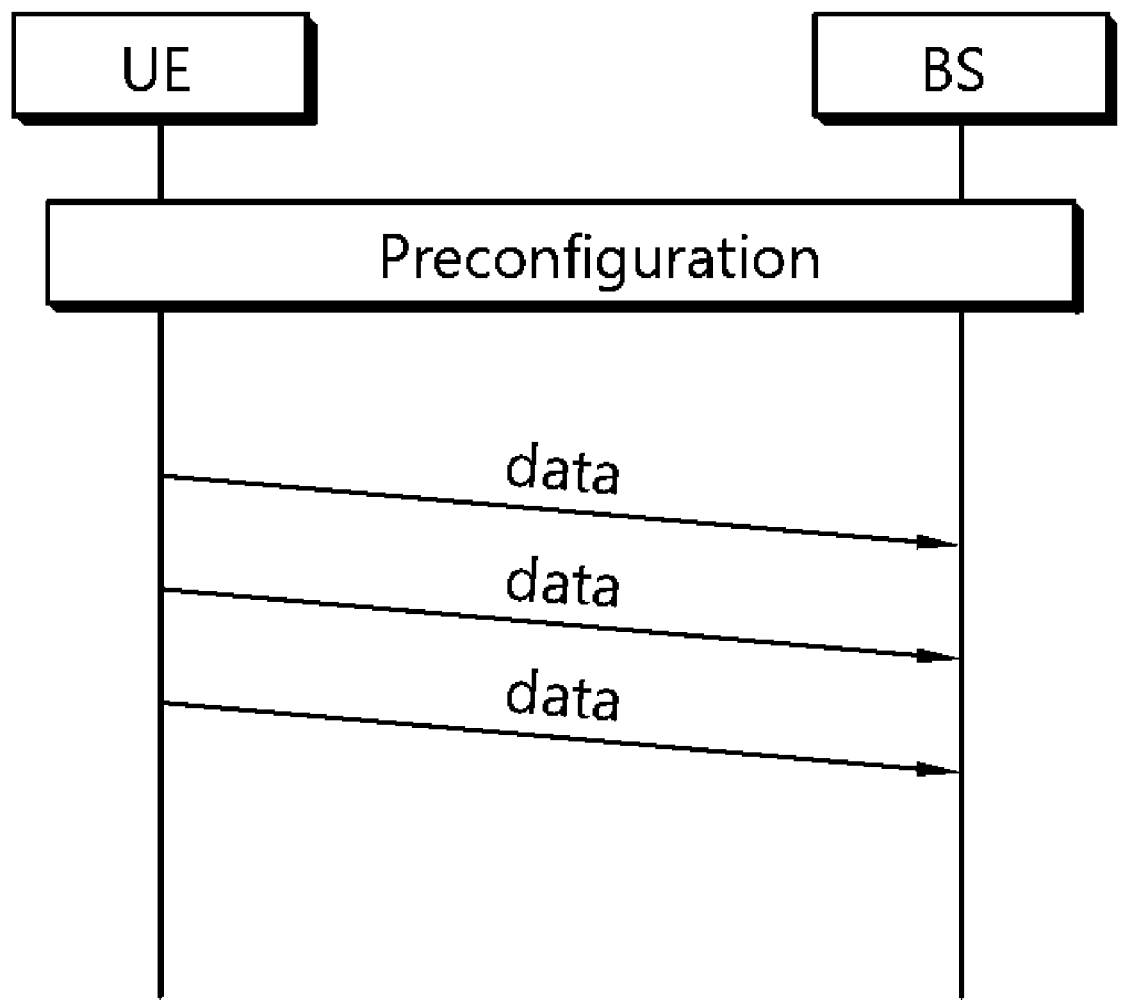
FIG. 4 is a flow chart illustrating uplink data transmission using persistent scheduling.
Figure 5:
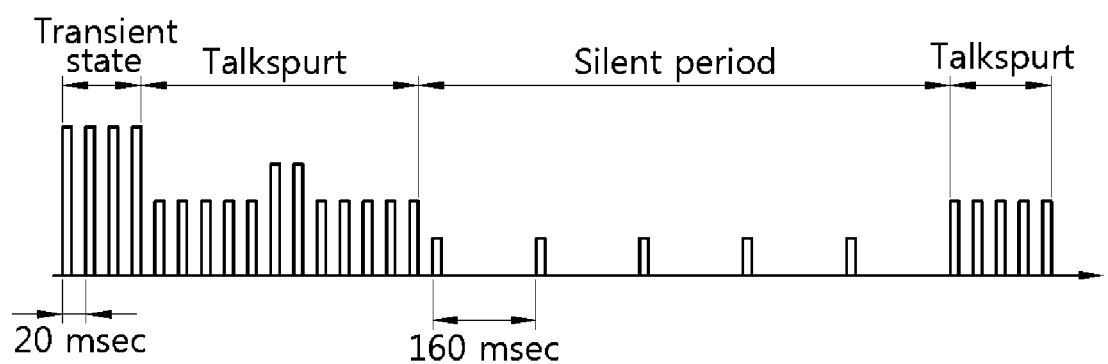
FIG. 5 illustrates a traffic model in a voice over Internet protocol (VoIP).
Figure 6:
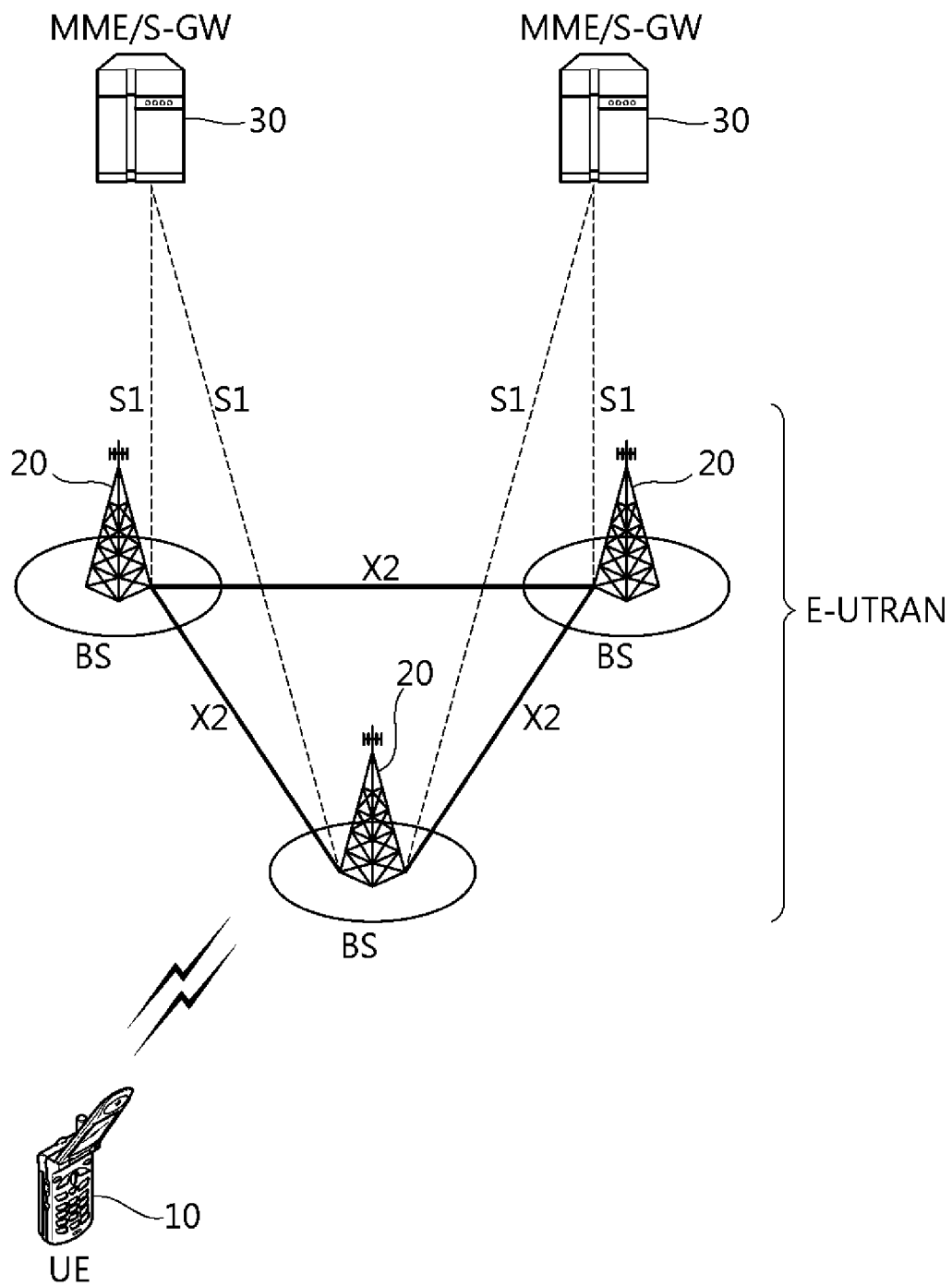
FIG. 6 illustrates a wireless communication system.

FIG. 6 shows a wireless communication system. The wireless communication system may be a network structure of an evolved-universal mobile telecommunications system (E-UMTS). The E-UMTS may be a long term evolution (LTE) system. The wireless communication system is widely deployed to provide a variety of communication services, such as voices, packet data, etc.

Referring to FIG. 6, an evolved-UMTS terrestrial radio access network (E-UTRAN) includes base stations (BSs) 20 each providing a control plane and a user plane.

A user equipment (UE) 10 may be fixed or have mobility, and may be referred to as another terminology, such as a mobile station (MS), a user terminal (UT), a subscriber station (SS), a wireless device, etc. The BSs 20 generally refer to fixed stations that communicate with the UE 10 and may be called another terminology, such as an evolved-node-B (eNB), a base transceiver system (BTS), an access point, etc. One or more cells may exist within the coverage of one BS 20. An interface for user traffic or control traffic transmission may be used between BSs 20. Hereinafter, downlink refers to communication from the BSs 20 to the UE 10, and uplink refers to communication from the UE 10 to the BSs 20.

The BSs 20 may be connected via an X2 interface. The BSs 20 are connected with evolved packet cores (EPCs), specifically, with mobility management entities (MMEs)/serving gateways (S-GWs) 30, via an SI interface. The SI interface supports the many-to-many relations between the BSs 20 and the MME/S-GWs 30.

Figure 7:
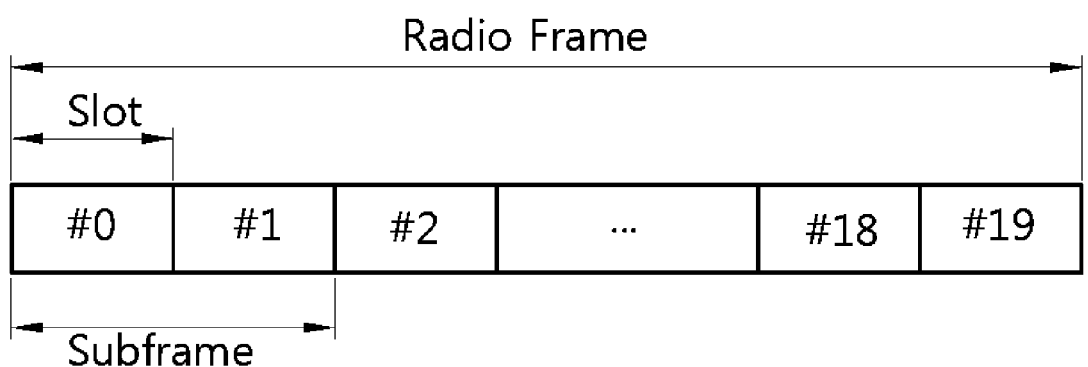
FIG. 7 illustrates the structure of a radio frame.

FIG. 7 illustrates the structure of a radio frame.

With reference to FIG. 7, the radio frame includes ten subframes, and a single subframe includes two slots. Time taken for transmitting a single subframe is called a transmission time interval (TTI). For example, the length of one subframe may be 1 ms, and that of one slot may be 0.5 ms. A single slot may include a plurality of OFDM symbols in a time domain and a plurality of resource blocks in a frequency domain.

The structure of the radio frame is merely illustrative, and the number of subframes included in the radio frame, the number of slots included in the subframes, the number of OFDM symbols included in the slots may be changed variably.

Figure 8:
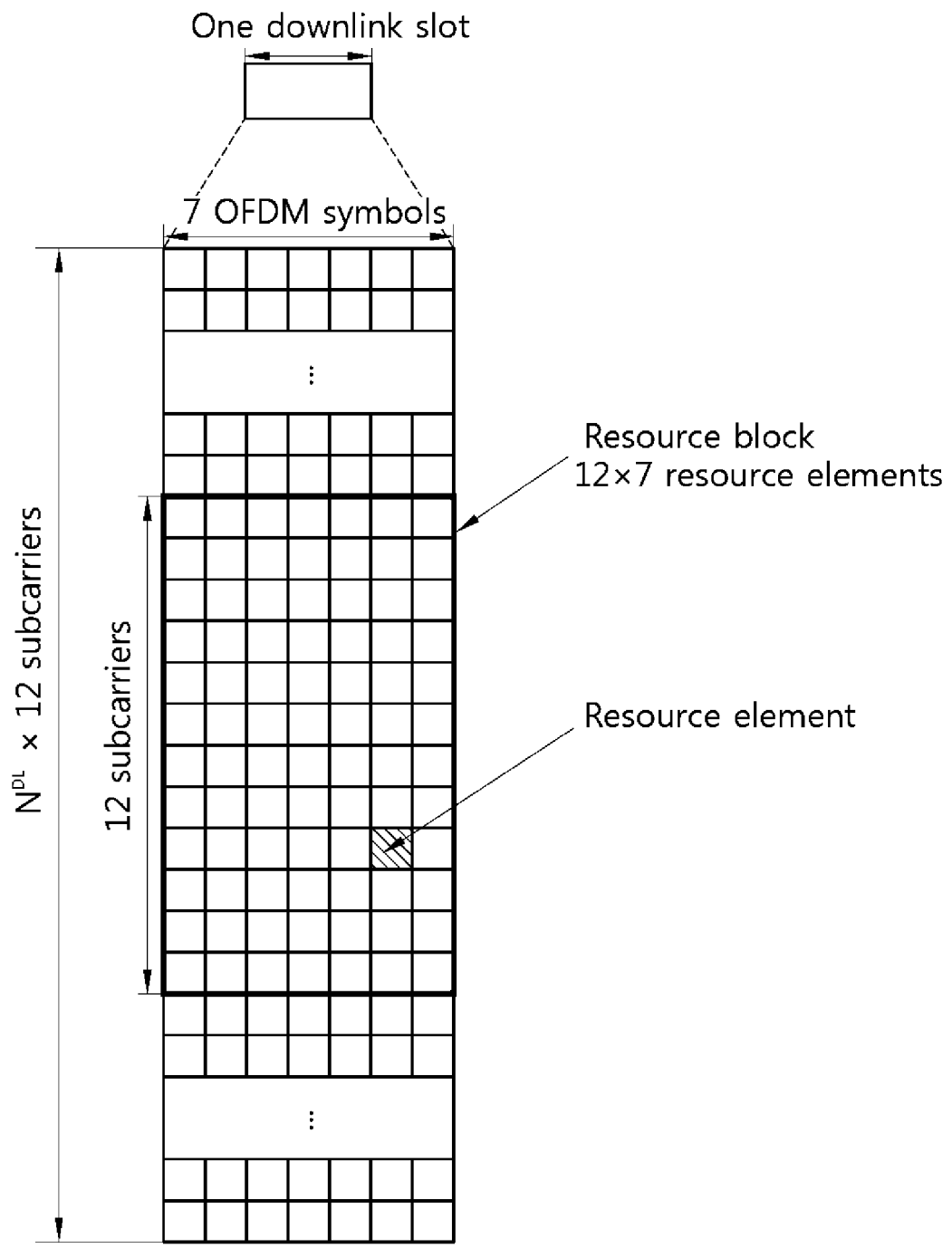
FIG. 8 illustrates a resource grid with respect to a single downlink slot.

FIG. 8 illustrates a resource grid with respect to a single downlink slot.

With reference to FIG. 8, one downlink slot includes a plurality of OFDM symbols in the time domain and a plurality of resource blocks in the frequency domain. Here, it is illustrated that the single downlink slot includes seven OFDM symbols and 12 subcarriers of one resource block, but this is merely illustrative without being limited thereto. Each element of the resource grid is called resource element, and one resource block includes 12×7 resource elements.

Figure 9:
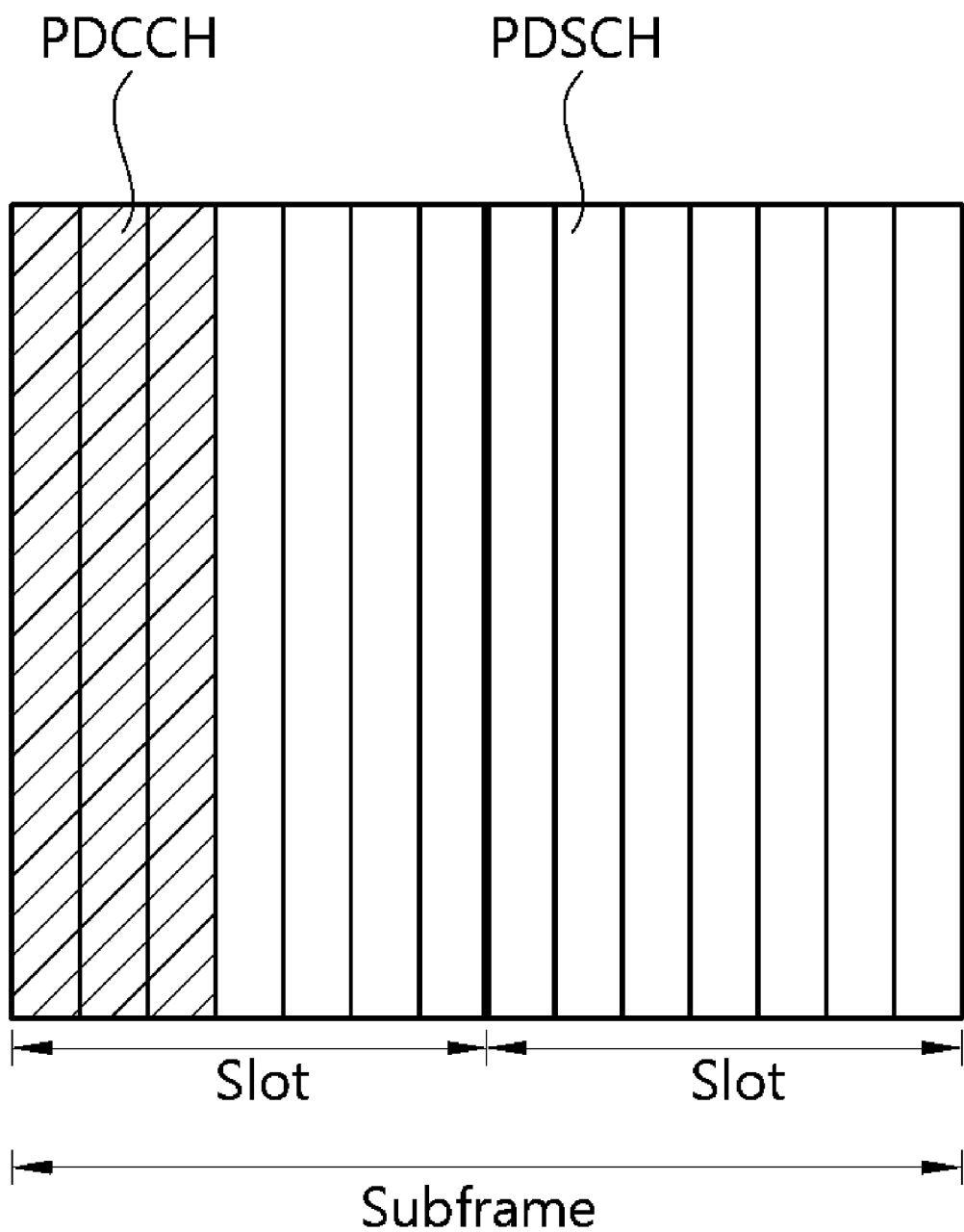
FIG. 9 illustrates the structure of a downlink subframe.

FIG. 9 illustrates the structure of a downlink subframe.

With reference to FIG. 9, the downlink subframe may be divided into a region to which a physical downlink control channel (PDCCH) carrying downlink control information is allocated and a region to which a physical downlink shared channels (PDSCH) carrying data is allocated. One subframe includes two slots, and one slot includes seven OFDM symbols. The first to third OFDM symbol regions are allocated to the PDCCH, and after the region to which the PDCCH is allocated is finished, the next OFDM symbol region is allocated to the PDSCH. Various control signals are transmitted via the PDCCH. But this is merely illustrative, and the disposition of the regions of the subframe to which the PDCCH and the PDSCH are allocated, the number of OFDM symbols included in one slot, or the like, are not meant to be limited.

Figure 10:
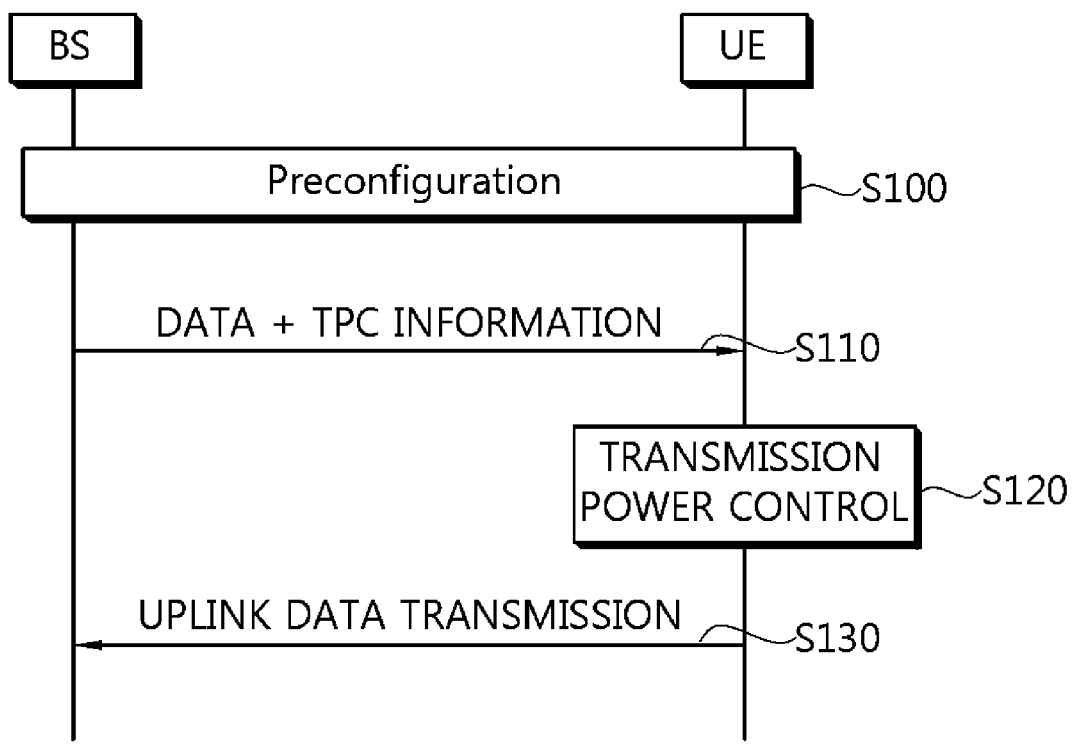
FIG. 10 is a flow chart illustrating a transmission power control (TPC) method according to one embodiment of the present invention.

FIG. 10 is a flow chart illustrating a transmission power control (TPC) method according to one embodiment of the present invention.

With reference to FIG. 10, the BS previously configures radio resources by using the persistent scheduling with respect to the UE (S100). The BS may previously determine a modulation method such as QPSK, 16 QAM, 64 QAM, or the like, the number of resource blocks to be used for data transmission, or the like. The BS transmits TPC information and data multiplexed with the TPC information to the UE via a data channel (S110). The data channel may be the PDSCH, the TPC information may be included by puncturing a resource element in which data is carried, and the resource element may be positioned near a reference signal. One or more resource elements may include the TPC information, and each TPC information may be inserted into a resource element contiguous to the reference signal or into a resource element positioned near the reference signal.

When radio resources are previously set by using the persistent scheduling, a method for transmitting a control signal such as TPC information is problematic. That is, because the TPC information is changed according to the movement of the UE, it cannot be previously set. Thus, the TPC information is multiplexed with data and then transmitted via the data channel, having the advantage in that a control channel does not need to be additionally used to transmit the TPC information.

The UE controls transmission power by using the TPC information received from the BS (S120). Here, if the TPC information is not received via a PDCCH including a downlink grant or via a TPC information-dedicated PDCCH, the UE can recognize that the TPC information has been transmitted via the PDSCH. Also, the BS may previously inform the UE through which channel the TPC information will be transmitted.

Transmission power PPUSCH(i) of a signal transmitted through uplink via the PUSCH in a subframe 'i' may be determined by Equation (1) shown below:

$$P_{PUSCH}(i)=\min\{P_{MAX}, 10\log_{10}(M_{PUSCH}(i))+ P_{O\_PUSCH}(j)+\alpha \cdot PL+\Delta_{TF}(TF(i))+f(i)\}[\text{dBm}] \quad [\text{Equation 1}]$$

wherein $P_{MAX}$ is a maximum allowed power, $M_{PUSCH}(i)$ is the size of PUSCH resource assignment (i.e., resource allocation) indicated by a valid resource block in the subframe 'i', $P_{O\_PUSCH}(i)$ is a parameter configured by the sum of 8-bit cell specific nominal component and a 4-bit UE specific component, 'α' is a 3-bit cell specific parameter provided by a higher layer, PL is a downlink pathloss estimate calculated in the UE, TF(i) is a PUSCH transport format valid for the subframe (i), and f(i) is a factor determined by $\delta_{PUSCH}$, a UE specific correction value called a TPC command. $\delta_{PUSCH}$ is TPC information transmitted from the BS to the UE via the PDCCH or the PDSCH.

Next, the transmission power $P_{PUCCH}(i)$ of a signal transmitted through uplink via the PUCCH in the subframe 'i' may be determined by Equation (2) shown below:

$$P_{PUCCH}(i)=\min\{P_{MAX}, P_{O\_PUCCH}+PL+\Delta_{TF\_PUCCH}(TF)+g(i)\}[\text{dBm}] \quad [\text{Equation 2}]$$

wherein $\Delta_{TF\_PUCCH}(TF)$ with respect to each PUCCH transport format (TF) is given by an RRC, $P_{O\_PUCCH}$ is a parameter configured by the sum of a 5-bit cell specific parameter provided by a higher layer and a UE specific component given by the RRC, and g(i) is a factor determined by $\delta_{PUCCH}$, a UE specific correction value called a TPC command. $\delta_{PUCCH}$ is TPC information transmitted from the BS to the UE via the PDCCH or the PDSCH.

The UE transmits uplink data with the transmission power to the BS (S130).

Figure 11:
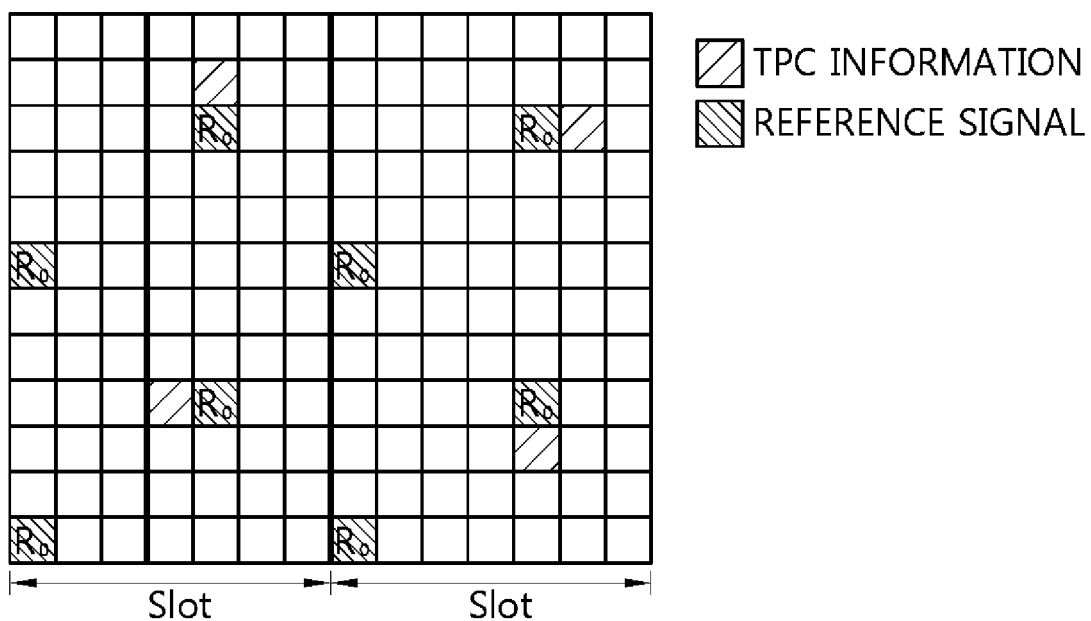
FIG. 11 illustrates a method of transmitting TPC information by using one antenna according to one embodiment of the present invention.

FIG. 11 illustrates a method of transmitting TPC information by using one antenna according to one embodiment of the present invention.

With reference to FIG. 11, one subframe includes two slots which are divided into the region to which the PDCCH is allocated and the region to which the PDSCH is allocated. One slot includes seven OFDMs in the time domain and 12 subcarriers of one resource block in the frequency domain. Reference signals are allocated to one or more resource elements. Here, $R_0$ refers to the reference signal. As shown in FIG. 11, TPC information is inserted by punctuating resource elements near the reference signals at the region to which the PDSCH, fourth to fourteenth OFDM symbols, is allocated.

Thus, when data is transmitted or received according to the persistent scheduling, there is no need to transmit the TPC information by using a TPC information-dedicated PDCCH. In addition, even when data is transmitted or received according to the dynamic scheduling, the PDCCH can be used to transmit another control signal, so it is advantageous in terms of the capacity of the control channel.

Figure 12:
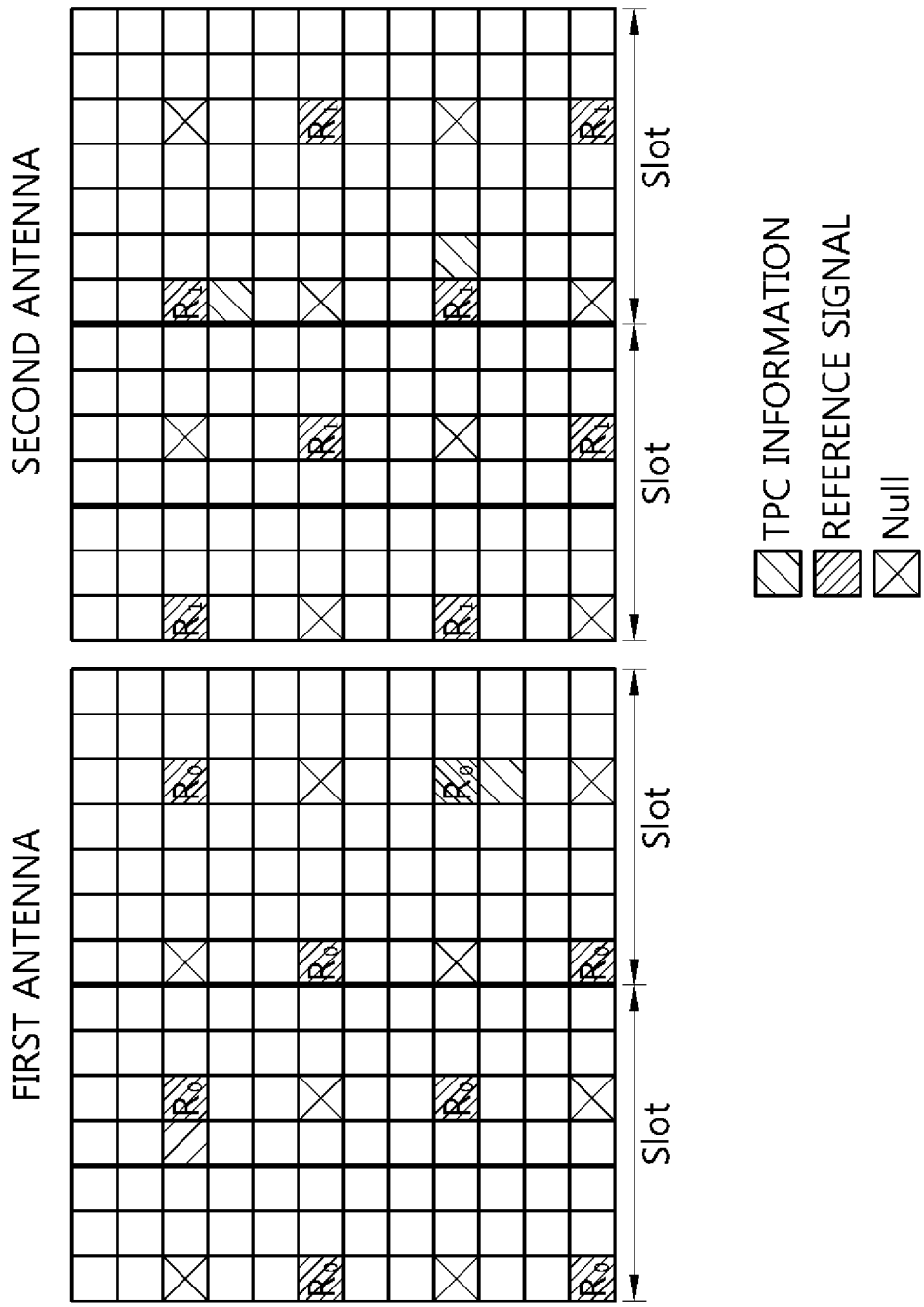
FIG. 12 illustrates a method of transmitting TPC information by using two antennas according to another embodiment of the present invention.

FIG. 12 illustrates a method of transmitting TPC information by using two antennas according to another embodiment of the present invention.

With reference to FIG. 12, TPC information is distributed to a data region of a subframe with respect to a first antenna and a data region of a subframe with respect to a second antenna and transmitted. Here, $R_0$ refers to reference signals on the subframe with respect to the first antenna, and $R_1$ refers to reference signals on the subframe with respect to the second antenna. The reference signals on the subframes with respect to each antenna may not overlap with each other in their positions. Namely, resource elements on the subframe with respect to the second antenna which are at the same positions as the reference signals on the subframe with respect to the first antenna may be NULL resource elements. The plurality of TPC information are distributed to the resource elements positioned at the data regions of the subframes with respect to the two antennas and transmitted, a loss of resource elements for data transmission can be reduced.

Figure 13:
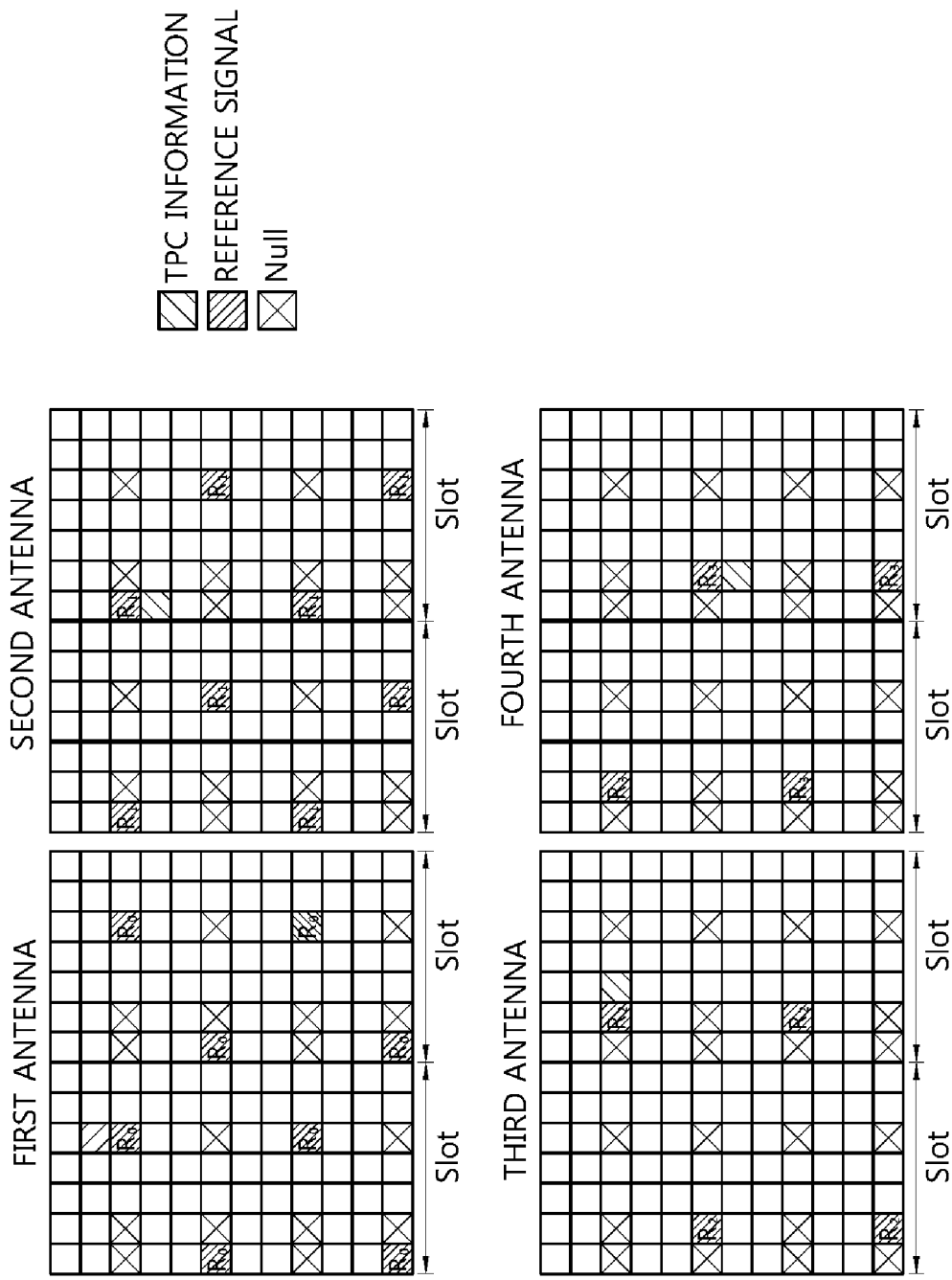
FIG. 13 illustrates a method of transmitting TPC information by using four antennas according to still another embodiment of the present invention.

FIG. 13 illustrates a method of transmitting TPC information by using four antennas according to still another embodiment of the present invention.

With reference to FIG. 13, TPC information is distributed to a data region of a subframe with respect to a first antenna, a data region of a subframe with respect to a second antenna, a data region of a subframe with respect to a third antenna, and a data region of a subframe with respect to a fourth antenna, and transmitted. Here, $R_0$ refers to reference signals on the subframe with respect to the first antenna, $R_1$ refers to reference signals on the subframe with respect to the second antenna, $R_2$ refers to reference signals on the subframe with respect to the third antenna, and $R_3$ refers to reference signals on the subframe with respect to the fourth antenna. The reference signals on the subframes with respect to each antenna may not overlap with each other in their positions. Namely, resource elements on the subframes with respect to the second to the forth antenna which are at the same positions as the reference signals on the subframe with respect to the first antenna may be NULL resource elements.

The plurality of TPC information are distributed to the resource elements positioned at the data regions of the subframes with respect to the four antennas and transmitted, a loss of resource elements for data transmission can be reduced.

Figure 14:
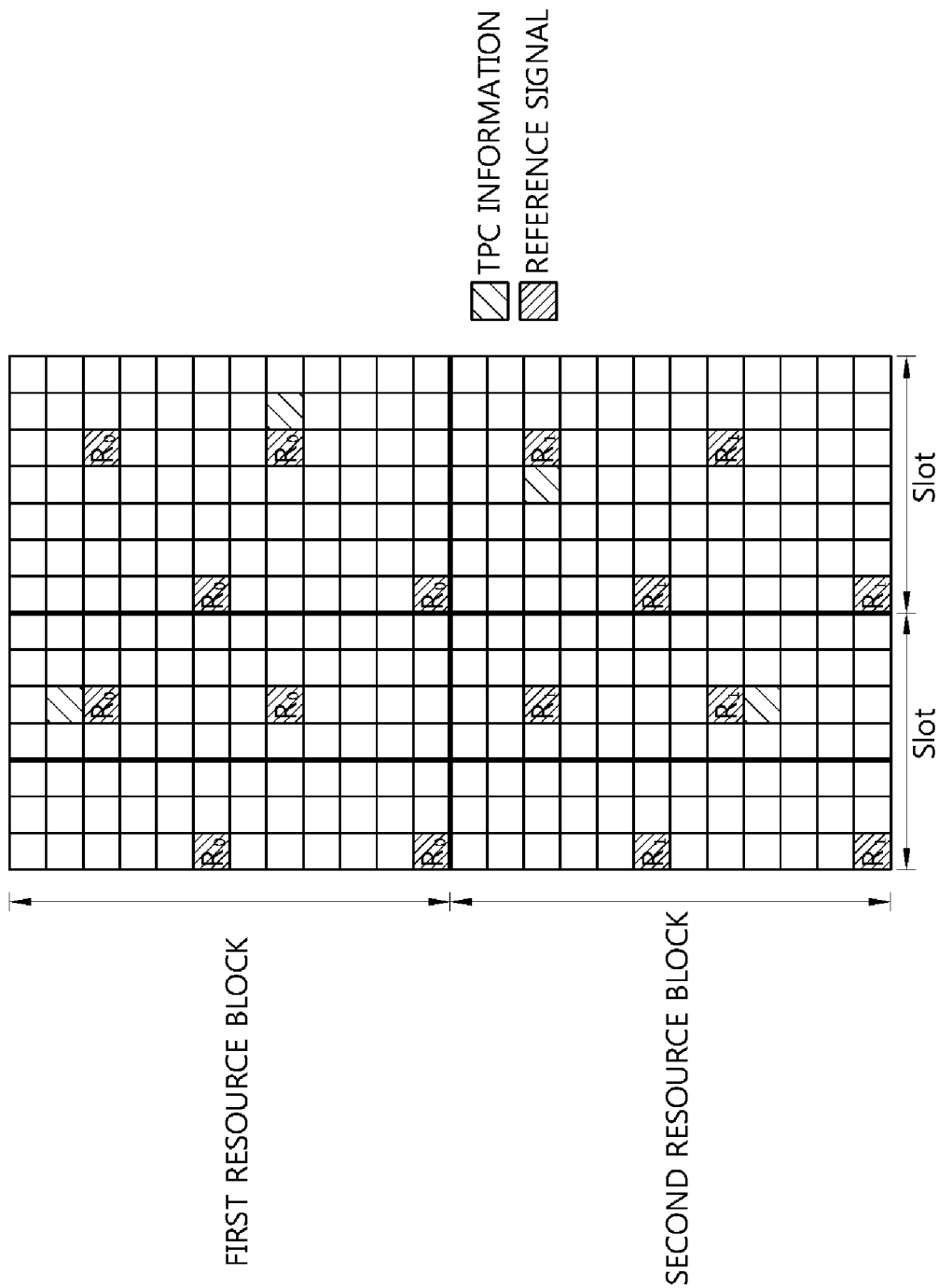
FIG. 14 illustrates a method of transmitting TPC information by using two resource blocks according to yet another embodiment of the present invention.

FIG. 14 illustrates a method of transmitting TPC information by using two resource blocks according to yet another embodiment of the present invention.

With reference to FIG. 14, TPC information is distributed to a data region of a subframe with respect to a first resource block and a data region of a subframe with respect to a second resource block, and transmitted. Here, $R_0$ refers to reference signals on the subframe with respect to the first resource block, $R_1$ refers to reference signals on the subframe with respect to the second resource block.

The plurality of TPC information are distributed to the two resource blocks and transmitted, a loss of resource elements for data transmission can be reduced.

A method for controlling transmission power of VoIP, one example of the persistent scheduling, will now be described. An uplink subframe may be divided into a region to which the PUCCH that carries uplink control information is allocated and a region to which the PUSCH that carries data is allocated. One UE does not simultaneously transmit the PUCCH and the PUSCH. The uplink control information transmitted via the PUCCH may include an ACK/NACK signal used for performing a hybrid automatic repeat request (HARQ), a channel quality indicator (CQI) indicating a downlink channel state, a scheduling request signal, namely, an uplink radio resource allocation request, and the like.

Figure 15:
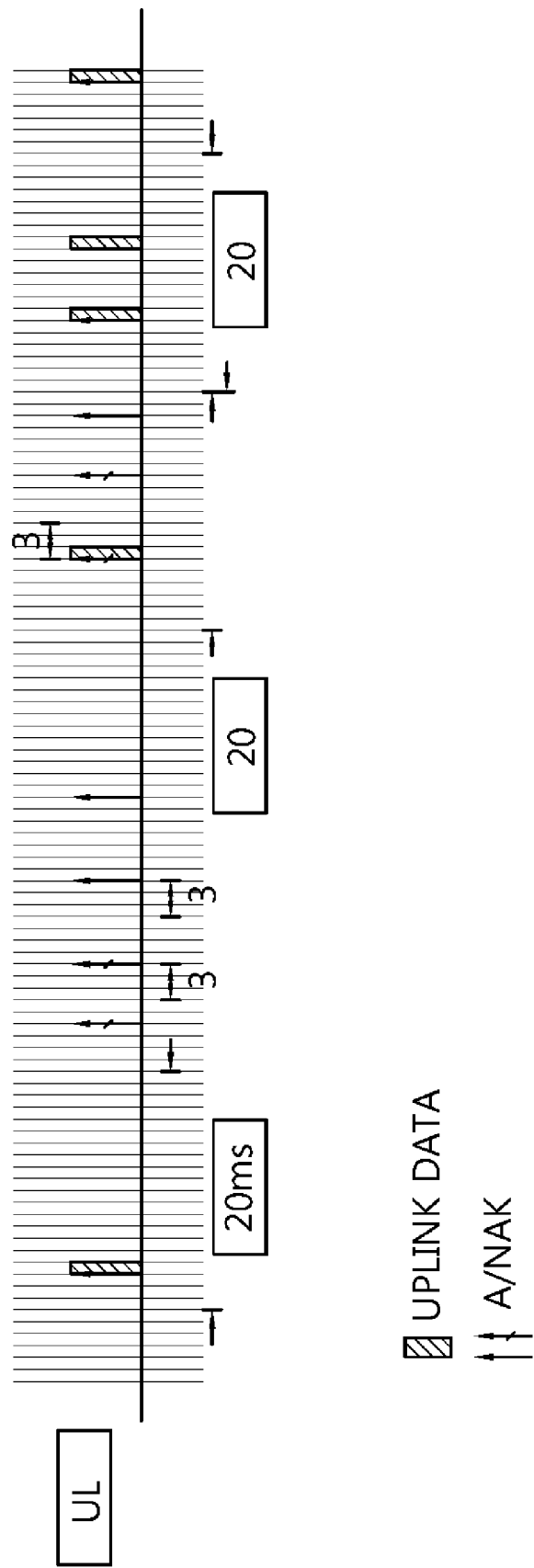
FIG. 15 illustrates a method of transmitting uplink data of the VoIP.

FIG. 15 illustrates a method of transmitting uplink data of the VoIP.

With reference to FIG. 15, it is noted that control information such as ACK/NACK may be transmitted solely or may be transmitted together with data.

Before the UE transmits uplink data to the BS, the BS transmits TPC information via the PDSCH. Here, if only the control information such as the ACK/NACK is uplink transmitted, the BS provides the UE with the TPC information for transmitting information via the PUCCH, and if both the control information such as the ACK/NACK and data are simultaneously transmitted, the BS provides the UE with TPC information for transmitting information via the PUSCH.

In transmitting uplink data using persistent scheduling, transmission power can be simply controlled without reducing the capacity of a control channel.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method of controlling transmission power associated with an uplink channel in a wireless communication system, the method comprising:

receiving, by a user equipment (UE), transmission power control (TPC) information multiplexed with user data via a physical downlink shared channel (PDSCH) of a downlink channel according to allocated persistent resources;

determining the transmission power for the PUSCH according to $P_{PUSCH}(i) = \min\{P_{MAX}, 10 \log_{10}(M_{PUSCH}(i)) + P_{O\_PUSCH}(j) + \alpha \cdot PL + \Delta_{TF}(TF(i)) + f(i)\}$ [dBm];

controlling, by the UE, the transmission power by using the TPC information; and transmitting, by the UE, uplink data, via an uplink channel that is a physical uplink shared channel (PUSCH) or a physical uplink control channel (PUCCH), with the controlled transmission power, wherein one subframe of the downlink channel comprises a physical downlink control channel (PDCCH) followed by the PDSCH, the PDCCH comprising at least three orthogonal frequency division multiple access (OFDMA) symbols, wherein the TPC information is not included in the PDCCH, wherein the TPC information is multiplexed with the user data by punctuating resource elements which include a portion of the user data, and wherein $P_{PUSCH}(i)$ is the transmission power for the PUSCH in the i-th subframe, wherein $P_{MAX}$ is a maximum allowed power, wherein $M_{PUSCH}(i)$ is a size of a PUSCH resource allocation indicated by a valid resource block in the i-th subframe, wherein $P_{O\_PUSCH}(j)$ is a parameter configured by a sum of an 8-bit cell specific nominal component and a 4-bit UE specific component, wherein '$\alpha$' is a 3-bit cell specific parameter, PL is a downlink pathloss estimate calculated in the UE, wherein $\Delta_{TF}(x)$ is a radio resource control (RRC) signaling with respect to a given PUSCH format x, wherein TF(i) is a PUSCH transport format valid for the i-th subframe, f(i) is a factor determined by $\delta_{PUSCH}$, and wherein $\delta_{PUSCH}$ is a UE specific correction value.

2. The method of claim 1, further comprising determining the transmission power for the PUCCH according to $P_{PUCCH}(i) = \min\{P_{MAX}, P_{O\_PUCCH} + PL + \Delta_{TF\_PUCCH}(TF) + g(i)\}$ [dBm], wherein $P_{PUCCH}(i)$ is the transmission power for the PUCCH in the i-th subframe, wherein $P_{MAX}$ is a maximum allowed power, wherein $P_{O\_PUCCH}$ is a parameter configured by a sum of a 5-bit cell specific parameter and a UE specific component, wherein $\Delta_{TF\_PUCCH}(x)$ is a radio resource control (RRC) signaling with respect to a given PUCCH format x, wherein TF is a PUCCH transport format, g(i) is a factor determined by $\delta_{PUCCH}$, and $\delta_{PUCCH}$ is a UE specific correction value.

3. The method of claim 1, further comprising:
positioning the TPC information contiguous to reference signals.

4. The method of claim 1, further comprising:
distributing the TPC information to a plurality of resource blocks.

5. A user equipment for controlling transmission power associated with an uplink channel in a wireless communication system, the UE comprising:
a radio frequency unit configured to:
receive transmission power control (TPC) information multiplexed with user data via a physical downlink shared channel (PDSCH) of a downlink channel according to allocated persistent resources;
control the transmission power by using the TPC information; and
transmit uplink data, via an uplink channel that is a physical uplink shared channel (PUSCH) or a physical uplink control channel (PUCCH), with the transmission power,
wherein the transmission power for the PUCCH is determined according To $$P_{PUSCH}(i)=\min\{P_{MAX},10\log_{10}(M_{PUSCH}(i))+P_{O\_PUSCH}(j)+\alpha \cdot PL+\Delta_{TF}(TF(i))+f(i)\}[dBm],$$

wherein $P_{PUSCH}(i)$ is the transmission power for the PUSCH in the i-th subframe $P_{MAX}$ is a maximum allowed power,
wherein $M_{PUSCH}(i)$ is a size of a PUSCH resource allocation indicated by valid resource block in the i-th subframe,
wherein $P_{O\_PUSCH}(j)$ is a parameter configured b a sum of an 8-bit cell specific nominal component and a 4-bit UE specific component,
wherein 'α' is a 3-bit cell specific parameter, PL is a downlink pathloss estimate calculated in the UE,
wherein $\alpha_{TF}(x)$ is a radio resource control (RRC) signaling with respect to a given PUSCH format x,
wherein TF(i) is a PUSCH transport format valid for the i-th subframe,
wherein f(i) is a factor determined by $\delta_{PUSCH}$, and
wherein $\delta_{PUSCH}$ is a UE specific correction value,
wherein one subframe of the downlink channel comprises a physical downlink control channel (PDCCH) followed by the PDSCH, the PDCCH comprising at least three orthogonal frequency division multiple access (OFDMA) symbols,
wherein the TPC information is not included in the PDCCH, and
wherein the TPC information is multiplexed with the user data by punctuating resource elements in which a portion of the user data is included.

6. The equipment of claim 5, wherein the transmission power for the PUCCH is determined according to $$P_{PUCCH}(i)=\min\{P_{MAX},P_{O\_PUCCH}+PL+\Delta_{TF\_PUCCH}(TF)+g(i)\}[dBm],$$

wherein $P_{PUCCH}(i)$ is the transmission power for the PUCCH in the i-th subframe, $P_{MAX}$ is a maximum allowed power,
wherein $P_{O\_PUCCH}$ is a parameter configured by a sum of a 5-bit cell specific parameter and a UE specific component,
wherein $\Delta_{TF\_PUCCH}(x)$ is a radio resource control (RRC) signaling with respect to a given PUCCH format x,
wherein TF is a PUCCH transport format,
wherein g(i) is a factor determined by $\delta_{PUCCH}$, and
wherein $\delta_{PUCCH}$ is a UE specific correction value.

7. The equipment of claim 5, wherein the TPC information is positioned contiguous to reference signals.

8. The equipment of claim 5, wherein the TPC information is distributed to a plurality of resource blocks.

* * * * *